Oct. 20, 1959 J. J. ZIMMERMANN 2,909,618
MESSAGE RECORDING AND REPRODUCING DEVICE
FOR A MOBILE RADIO-TELEPHONE RECEIVER
Filed Dec. 15, 1952
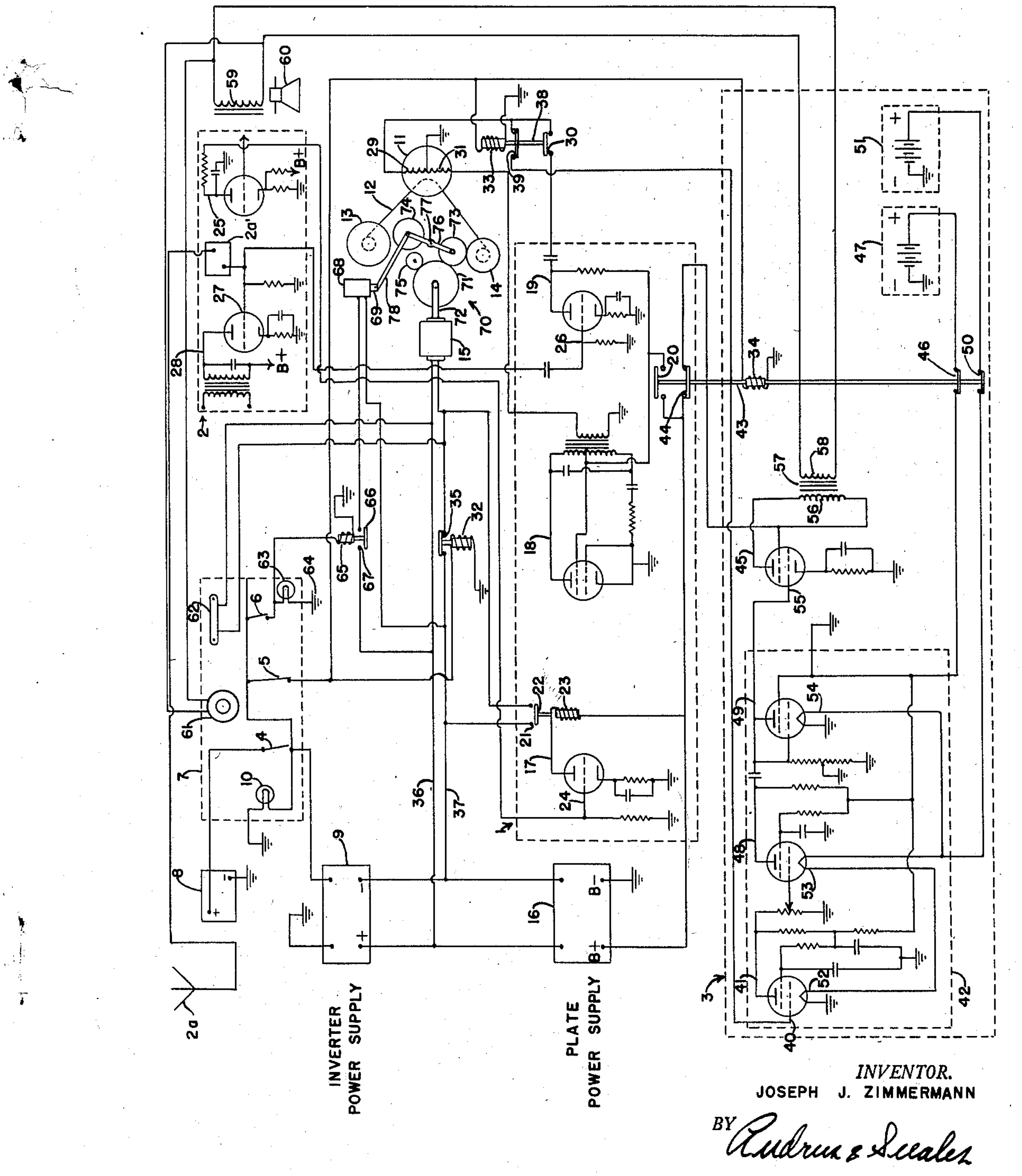
INVENTOR.
JOSEPH J. ZIMMERMANN
BY Andrus & Sceales
ATTORNEYS United States Patent Office 2,909,618 Patented Oct. 20, 1959

2,909,618

MESSAGE RECORDING AND REPRODUCING DEVICE FOR A MOBILE RADIO-TELEPHONE RECEIVER

Joseph J. Zimmermann, Milwaukee, Wis., assignor to Electronic Secretary Industries, Inc., Waukesha, Wis., a corporation of Wisconsin Application December 15, 1952, Serial No. 326,120

2 Claims. (Cl. 179—100.11)

This invention relates to a device for recording messages transmitted over a radio-telephone receiver operating in a mobile unit.

A purpose of the invention is to provide a recording and reproducing device for automatic operation with a radio-telephone receiver.

Another purpose of the invention is to provide a mobile recording device which operates only during the time an incoming message is being transmitted over the radio-telephone whereby the recording record is conserved.

Another purpose of the invention is to provide a recording device, for use in a mobile unit, having the controls of the device placed in a convenient location for operation thereof, while the recorder and associated equipment is housed in a storage area of the mobile unit.

A further purpose of the invention is to provide a recording device for mobile use which utilizes standard parts, thereby allowing production of the device at a minimum cost.

The drawing is a schematic diagram of the recording and reproducing circuits of the invention in combination with an ordinary mobile radio-telephone receiver.

Referring to the drawing, the illustrated embodiment of the invention comprises, in general, a recording circuit 1 which is electrically connected to a mobile radio-telephone receiver 2 for the recordation of incoming messages.

A reproducing circuit 3 is utilized to play back the recorded messages.

Control of the invention is by manual operation of switches 4, 5 and 6 which are housed in the control head 7. A six-volt storage battery 8 serves as the initial source of power for the apparatus. An inverter power supply 9 is used to convert the output of the six-volt battery 8 to a 110 volt A.C. Voltage.

The mobile radio-telephone receiver 2, hereinafter referred to as the receiver, may be any ordinary frequency modulated receiver as for example is now used in taxicabs and police cars. For this reason, the receiver 2 is shown in block form except for the connections to the recording circuit 1, as subsequently described.

The invention is adapted for operation in a mobile vehile operating on a six volt storage battery 8 as normally found in an automobile. The battery 8 may be replaced by any desired mobile source of voltage, the inverter power supply 9 being correspondingly replaced to give a suitable voltage for the operation of the recording circuit 1 and the motor for driving the recorder.

A pilot light 10 is mounted on the control head 7 and is connected in circuit with storage battery 8 through main control switch 4.

Main control switch 4 also connects the storage battery 8 across the input of the inverter power supply 9 which is an ordinary standard inverter for changing six volt direct current source to a 110 volt alternating current source of power.

Both the recording circuit 1 and the reproducing circuit 3 utilize the standard magnetic recording head 11.

The recording tape 12 is wound from spool 13 past the recording head 11 and to spool 14 by operation of the recorder motor 15 as subsequently described.

A plate power supply 16 which is connected to the output of the inverter power supply 9 serves as a source of B+ voltage for the electronic tubes of the recording circuit 1. The plate power supply 16 may be of any standard variety giving a suitable direct current output with an input of 110 volt alternating current. The plate power supply 16 is therefore shown in block form in the drawing.

The electronic tubes for the recording circuit 1 are the trigger amplifier 17, the oscillator 18 and the matching stage 19.

The electrical connections for the recording of an incoming message are described as follows:

The output of the plate power supply 16 is connected in the plate circuits of the trigger amplifier 17, the oscillator 18 and the matching stage 19. The connection of the oscillator 18 and the matching stage 19 to the plate power supply 16 is through normally closed relay contacts 20.

The recorder motor 15 is connected across the output of the inverter power supply 9 through the normally open relay contacts 21 of relay 22. Opening and closing of relay contacts 21 is controlled by relay coil 23 of relay 22. The relay coil 23 is connected in the plate circuit of trigger tube 17 and is energized when current flows therein. The control grid 24 of trigger tube 17 is connected to the plate circuit of a radio frequency carrier operated direct current amplifier 25 in the receiver 2. Therefore, the flow of plate current in trigger tube 17 is responsive to an incoming signal and the operation of the recorder motor 15 is controlled by such incoming signal.

To pick up the incoming message for recordation thereof, the control grid 26 of the matching stage 19 is connected to the control grid 27 of a stage of the audio amplifier 28 in the receiver 2.

The recording coil 29 of the recording head 11 is connected in the plate circuit of the matching stage 19 via relay contacts 30. The recording coil 29 magnetically records the incoming message on the record tape 12.

The output of the oscillator 18 is connected to the erasing coil 31 in the recording head 19.

The plate power supply 16, trigger tube 17, oscillator 18, matching stage 19, and recording head 11 are all of an ordinary variety and no further description is believed necessary for a full understanding of the invention by those skilled in the art.

The reproducing circuit is described as follows:

To complete the reproducing circuit, playback switch 5 is closed. Closing of switch 5 energizes relay coils 32, 33 and 34 which are in parallel connection to the storage battery 8 through switch 5.

When relay coil 32 is energized, it attracts its armature to close relay contacts 35. The recorder motor 15 is then connected across the output of the inverter power supply 9 by leads 36 and 37, shunting out relay 22.

Simultaneously, relay coil 33 is energized and retracts its armature 38 to close relay contacts 39 and open relay contacts 30. The recording coil 29 is then in a closed circuit with the control grid 40 of the first stage 41 of preamplifier 42.

Similarly, relay coil 34 is energized and attracts its armature 43 to close relay contacts 44 connecting the plate power supply 16 in the plate circuit of the output tube 45. Relay contacts 46 close connecting the B battery 47 in the plate circuits of the three stages 41, 48 and 49 of preamplifier 42. Relay contacts 50 close placing the A battery 51 in circuit with the three cathodes 52, 53 and 54 of the three stages 41, 48 and 49 of preamplifier 42.

The output of the preamplifier 42 is connected in circuit with the control grid 55 of the output tube 45.

The primary winding 56 of transformer 57 is connected in the plate circuit of the output tube 45. The secondary winding 58 is connected to the voice coil 59 of the loudspeaker 60.

Since the preamplifier stages 41, 48 and 49 and output tube 45 are of the usual variety utilizing ordinary tubes, such as the tetrodes illustrated, no further description thereof is believed necessary.

A volume control pad 61 which is housed in the control head 7 is connected in parallel with the voice coil 59 of loudspeaker 60.

A neon light 62, which is housed in control head 7, is connected across the recorder motor 15. The neon light 62 indicates the operation of recorder motor 15.

To accomplish playback of the recorded message, the recording tape 12 must be rewound to its initial position. The circuit connections for this purpose are as follows:

Rewind switch 6 is manually closed. The rewind indicator lamp 63 is then in circuit with storage battery 8 as follows: starting with storage battery 8, switch 5, switch 6, lamp 63 and ground 64. Similarly, relay coil 65 is connected in parallel with lamp 63 to storage battery 8.

Relay armature 66 operates to open and close relay contacts 67. When relay contacts 67 are closed, a reversing solenoid 68 is connected across the output of the inverter supply 9.

The armature 69 of solenoid 68 is mechanically connected to the pulley system 70 which connects the motor 15 to spool 13 and spool 14 so that when the armature 69 retracts the spools 13 and 14 are driven in a reverse direction.

The pulley system 70, as illustrated in Figure 1, comprises a driving pulley 71 connected to motor shaft 72 of motor 15. To drive the recording tape 12 from spool 13 to spool 14, the idler pulley 73 transmits the rotating power of pulley 71 to spool 14.

To rewind the recording tape 12 from spool 14 to spool 13, the idler pulley 74 is pulled into engagement with spool 13. The driving pulley 71 transmits its power through a reversing pulley 75, to the idler pulley 74 and then to spool 13.

The idler pulleys 73 and 74 are attached by a rigid member 76 which is pivotally supported by a pin 77. Further, the idler pulley 74 is attached to the solenoid armature 69 by rigid member 78 for the positioning of the idler pulleys 73 and 74.

The above described pulley system 70 may be replaced by any other suitable mechanism for rewinding the recording tape 12; for example, gears rather than pulleys could be utilized.

As noted previously, the receiver 2 is any standard receiver. The incoming signal is a frequency modulated signal which originates in the antenna 2*a*, passes through various R.F. amplifiers and I.F. amplifiers and other circuit elements shown as a block 2*a'* and then passes to the control grid 27 of the audio amplifier stage 28 and also to the control grid 26 of the matching stage 19.

The operation of the embodiment of the invention, as described above, is as follows:

The control head 7 is placed adjacent the dash board portion of the mobile vehicle, or in some other position which allows convenient operation of the switching means. The balance of the equipment, described above, is located in the trunk or other storage area of the mobile vehicle.

Assume the operator of the vehicle wishes to leave the vehicle and have any incoming message recorded.

Main control switch 4 is turned to a closed position, while the switches 5 and 6 are left in normal open position. Closing of switch 4 illuminates pilot light 10 and impresses the six volts direct current of storage battery 8 on the inverter power supply 9.

The 110 volt alternating current output from the inverter power supply 9 is fed to the plate power supply 16 and converted to a direct current output. The output of plate power supply 16 is fed to the plate circuit of trigger tube 17, and through normally closed relay contacts 20 to the plate circuit of the oscillator tube 18 and matching tube 19. The apparatus is, at this point, in a standby condition and upon receipt of a message over receiver 2 the apparatus automatically operates to record the incoming message as follows:

The radio frequency carrier of the incoming message produces a direct current voltage in the amplifier 25 or receiver 2. When a voltage is thus produced in amplifier 25, a current flows in the plate circuit of trigger tube 17, thereby energizing relay coil 23. Relay contacts 21 close and the motor 15 is energized by the output of the inverter power supply 9.

The motor 15 operates through the pulley system 70 to wind the recording tape 12 from spool 13 to spool 14. The recording tape 12 passes across the recording head 11 and has the incoming message recorded thereon, as subsequently described.

The incoming message is electrically transmitted simultaneously to the audio amplifier 28 of the receiver 2 and to the matching stage 19. The matching stage 19 amplifies the electrical signals and matches the impedance of the recording head 11 to give a good transfer of power from the matching stage 19 to recording head 11.

The output of the matching stage 19 is sent to the recording coil 29 through normally closed contacts 30 and the message is recorded on the recording tape 12.

The oscillator 18 which operates at a frequency above that of human sound energizes the erasing coil 31. The erasing coil 31 will record a note which is of a frequency above that of human sound on the recording tape 12 and thereby erase any previously recorded message. The erasing coil 31 also operates to allow a linear recordation of the incoming message.

When the incoming message ends, the direct current voltage produced in the amplifier 25 by the radio frequency carrier also ceases. The current then ceases to flow in the plate circuit of the trigger tube 17 and relay contacts 21 open to disconnect the motor 15 from its power supply 9. The motor 15 is de-energized and the recording tape 12 is no longer driven across the recording head 11. The invention is once again in standby condition.

The recording tape 12 is only in operation during the period of an incoming message and none of the recording tape 12 is wasted.

When it is desired to play back any message which has been recorded, the recording tape 12 is first rewound to its initial position. Rewinding of the tape 12 is accomplished by closing switch 6 which energizes relay coil 65 and thereby closes relay contacts 67. When relay contacts 67 close, the solenoid 68 is energized and its armature 69 retracts. The spool 13 is then driven in a reverse direction and rewinds the recording tape 12 to its starting position. After the tape 12 is rewound the switch 6 is opened and the motor 15 drives the spool 14 in a forward direction thereby winding tape 12 from spool 13 to spool 14 through the recording head 11 for playback of the recorded message.

A rewind light 63 is illuminated during the time the tape 12 is being rewound.

For play back of a recorded message, switch 5 is closed. The relay coils 32, 33 and 34 are energized by the storage battery 8.

Energization of relay coil 32 causes the closing of relay contacts 35. The motor 15 is then energized independently of relay 22; the latter being shunted out.

Relay contacts 30 open and relay contacts 39 close upon energization of relay coil 33. The recording coil 29 is disconnected from the matching stage 19 and connected to the control grid 40 of the first stage 41 of the audio preamplifier 42. The message on the recording tape 12 will be fed by the recording coil 29 to the preamplifier 42. The electrical signals are amplified in the three stages 41, 48 and 49 of the preamplifier 42 and then fed to the output tube 45. From the output tube 45 the signals are transmitted to the voice coil 59 of loudspeaker 60.

The volume of the loudspeaker 60 is controlled by the volume control pad 61 which is operated from the control head 7.

Closing of switch 5, as previously stated, energizes relay coil 34. Relay armature 43 is attracted and opens relay contacts 20 and closes relay contacts 44, 46 and 50.

Opening of relay contacts 20 disconnects the oscillator tube 18 and matching tube 19 from the plate power supply 16.

The closing of contacts 44 connects the plate power supply 16 to the output tube 45 and thereby supplies a B+ voltage to the output tube 45 to allow operation thereof.

Closing of relay contacts 46 connects the "B" battery 47 in the plate circuits of the three stages 41, 48 and 49 of the preamplifier 42 to place a B+ voltage in the plate circuits. The closing of contacts 50 connect the "A" battery in circuit with the cathode filaments 52, 53 and 54 of the three stages 41, 48 and 49 of the preamplifier 42 for the heating of the cathode filaments.

To disconnect the apparatus, the operator opens switch 4 and thereby disconnects the storage battery 8.

Various embodiments of the invention may be employed within the scope of the following claims.

I claim:

1. A mobile radio-telephone receiver in combination with an automatic message recording and reproducing device comprising, a record for recording messages received over said radio-telephone receiver, a record support, means engaging said record for recording a message thereon, said means being utilized for pickup of said message for subsequent reproduction of said message, a motor connected to said record support to relatively move said record and said last named means, a low direct-current voltage source energizing said motor, a recording circuit connecting said named means and said receiver, a trigger relay amplifier in said recording circuit connected in circuit with said motor and said voltage source and said receiver whereby energization of said motor is in response to a message received over said receiver, relay contacts connected in circuit with said source of voltage and said motor for shunting out said trigger relay amplifier, a relay to open and close said relay contacts, manually operated switching means for connecting said relay in circuit with said voltage source for energization thereby, a reproducing circuit connected to said named means for reproduction of a recorded message, relay means for alternately connecting said reproducing circuit and said recording circuit to said first named means, and a manually operated switch connecting said last named relay means in circuit with said source of voltage.

2. In combination with an automotive vehicle having a battery, a mobile frequency modulated receiver, a wire recorder with a recording and a play back circuit, means to connect said wire recorder to the vehicle battery to constitute the battery as a source of power thereto, an inverter power supply connected in circuit with said battery and said wire recorder, a relay connecting said receiver and said recorder whereby operation of the recorder is in response to the condition of said receiver, an electrical conductor connecting said recorder to the audio amplifier of said receiver, relay means connected to said motor and said inverter power supply in parallel with said first named relay for bypassing said first named relay when utilizing the play back circuit, and manually operated switching means connected in circuit with said second named relay means and said battery to control operation of said second named relay.

References Cited in the file of this patent

UNITED STATES PATENTS

| | | |
|---|---|---|
| 1,981,689 | Deakin et al. | Nov. 20, 1934 |
| 2,282,102 | Tunick | May 5, 1942 |
| 2,314,834 | Kiel | Mar. 23, 1943 |
| 2,329,492 | Thiede | Sept. 14, 1943 |
| 2,361,653 | Roberts | Oct. 31, 1944 |
| 2,407,417 | Halstead | Sept. 10, 1946 |
| 2,655,563 | Connell | Oct. 13, 1953 |